United States Patent [19]  [11] 4,371,675
Miyamoto et al.  [45] Feb. 1, 1983

[54] PROCESS FOR PREPARATION OF MODIFIED AROMATIC HYDROCARBON RESIN

[75] Inventors: Akira Miyamoto, Hiratsuka; Masayoshi Maeda, Nishinomiya; Yoshitaka Yamagishi, Hiratsuka, all of Japan

[73] Assignee: Mitsubishi Gas Chemical Company, Inc., Tokyo, Japan

[21] Appl. No.: 256,136

[22] Filed: Apr. 21, 1981

[30] Foreign Application Priority Data

Apr. 28, 1980 [JP] Japan .................................. 55/56743

[51] Int. Cl.$^3$ ........................... C08G 10/04; C08J 3/00
[52] U.S. Cl. .................................... 525/472; 528/495; 528/499; 528/500
[58] Field of Search ................ 525/472; 528/501, 495, 528/499, 500

[56] References Cited

U.S. PATENT DOCUMENTS 3,398,107  8/1968  Rowe et al. .......................... 525/472
4,197,378  4/1980  Rudolphy et al. ................... 525/139

FOREIGN PATENT DOCUMENTS 46-33786  4/1971  Japan .

Primary Examiner—Allan Lieberman
Attorney, Agent, or Firm—Armstrong, Nikaido, Marmelstein & Kubovcik

[57] ABSTRACT

A modified aromatic hydrocarbon resin is prepared by reacting an aromatic hydrocarbon-formaldehyde resin with an unsaturated polybasic acid or an anhydride thereof, if desired, together with a saturated polybasic acid or an anhydride thereof, while making water or water and an aliphatic alcohol present in the reaction system and removing the formaldehyde formed by the reaction. The cured product has a good mechanical strength and a high resistance to water and alkalis.

8 Claims, No Drawings

PROCESS FOR PREPARATION OF MODIFIED AROMATIC HYDROCARBON RESIN

BACKGROUND OF THE INVENTION

This invention relates to an improved process for the preparation of a modified aromatic hydrocarbon resin, by reacting an aromatic hydrocarbon-formaldehyde resin with an unsaturated polybasic acid or an anhydride thereof, if desired, together with a saturated polybasic acid or an anhydride thereof. More particularly, the invention relates to a process characterized in that water or water and an aliphatic alcohol is made present in the reaction system during the reaction and the reaction is made to proceed while removing the formaldehyde formed by the reaction.

It has hitherto been widely known that a modified aromatic hydrocarbon resin, which may be hereinafter referred to briefly as "modified resin", can be produced by reacting an aromatic hydrocarbon-formaldehyde resin with an unsaturated polybasic acid or an anhydride thereof such as maleic acid or maleic anhydride. This modified resin may be also regarded as a modified unsaturated polyester, which may be dissolved in monomers such as styrene to be used for purposes similar to those of conventional unsaturated polyester resin.

In case, however, an aromatic hydrocarbon-formaldehyde resin, e.g. xylene-formaldehyde resin, is reacted with an unsaturated dibasic acid anhydride, e.g. maleic anhydride, to prepare said modified resin, the difficulty lies in the fact that gelation tends to occur during the reaction. It was proposed to use a specified amount of the unsaturated dibasic acid or an anhydride thereof in order to overcome the difficulty (see Japanese Patent Publication No. 33,786/71). Although the gelation can be fairly prevented by the proposed method, the cured product has a low crosslinking density and insufficient mechanical strength. Therefore, the modified resin as above-mentioned is not satisfactory for use as a resin for fibre reinforced plastics (FRP) in particular.

In order to obtain a modified resin suitable to the use as the resin for FRP in particular, we have studied processes for its preparation carefully and found that the gelling tendency in the final period of the reaction and the low reactivity of the modified resin obtained according to the proposed method are due to the formaldehyde formed in the course of reaction.

It might be sufficient if the formaldehyde formed by the reaction is not made present in the reaction system, but it is undesirable to discharge the gaseous formaldehyde into the atmosphere, since it contaminates the working environment. Furthermore, in case a discharge pipe, or the like is employed, such measures would also be unfavorable since the formaldehyde deposits on the inside wall of the pipe and clogs the pipe. Thus, any of the cases is not satisfactory for the commercial practice.

SUMMARY OF THE INVENTION

The present inventors have made extensive studies on an economically and commercially practicable process capable of overcoming these drawbacks, and, as a result, have established the present invention.

An object of the present invention is to provide a modified aromatic hydrocarbon resin having high reactivity with monomers, and further to provide a cured product having superior mechanical strenght and resistance to water and alkalis.

Another object of the present invention is to provide a process for the preparation of a modified aromatic hydrocarbon resin wherein the reaction of an aromatic hydrocarbon-formaldehyde resin with an unsaturated polybasic acid or an anydride thereof and if desired, with a saturated polybasic acid or an anhydride thereof, proceeds smoothly and efficiently without causing any gelation during the reaction.

The present invention relates to a process for the preparation of a modified aromatic hydrocarbon resin by reacting an aromatic hydrocarbon-formaldehyde resin with an unsaturated polybasic acid or an anhydride thereof, if desired, with a saturated polybasic acid or an anhydride thereof, wherein the improvement comprises making water or water and an aliphatic alcohol present in the reaction system, and carrying out the reaction, while removing formaldehyde formed by the reaction to the outside of the reaction system.

In the present invention, although water may be placed in the reactor prior to the reaction, it is preferable to introduce water into the reactor in the form of steam during the reaction. Of course, the foregoing both measures may be taken at the same time.

DETAILED DESCRIPTION OF THE INVENTION

According to the present invention, for example, when water is made present in the reaction system, and the reaction of an aromatic hydrocarbon-formaldehyde resin with an unsaturated polybasic acid or an anhydride thereof, is carried out, the formaldehyde formed by the reaction may be removed in the form of an aqueous solution to the outside of the reaction system; hence no clogging occurs in the discharge pipe, and no gelation is observed during the reaction. Accordingly, it is possible to complete the reaction efficiently and smoothly.

The modified resin prepared by the process of the present invention is readily soluble in monomers such as styrene, and its curing properties are similar to those of conventional unsaturated polyester resins. The cured product obtained from the modified resin of the present invention far exceeds the conventional unsaturated polyester resins in corrosion resistance, and resistance to water and alkalis.

The term "aromatic hydrocarbon-formaldehyde resins" used herein means those obtainable by reacting an aromatic hydrocarbon compound, e.g. xylene, mesitylene, toluene, benzene or stylene, with formaldehyde in the presence of an acid catalyst, e.g. sulphuric acid.

Examples of the unsaturated polybasic acid or an anhydride thereof to be used in the process of the present invention include maleic anhydride, maleic acid, fumaric acid and itaconic acid, and preferably maleic anhydride. Examples of the saturated polybasic acid or an anhydride thereof to be used include adipic acid, sebacic acid, phthalic anhydride, isophthalic acid and terephthalic acid, all of which are used for the preparation of conventional unsaturated polyester resins.

In the process of the present invention the amount of water or water and an aliphatic alcohol to be made present in the reaction system should be not less than 5 parts by weight per 100 parts by weight of the aromatic hydrocarbon-formaldehyde resin, and 20 to 35 parts by weight are usually used in consideration of the time, etc. required to remove the formaldehyde. In case water is introduced in the form of steam, the above-mentioned quantity in terms of the weight of condensed water may be used. In case an aliphatic alcohol is used together with water, the ratio of alcohol to water is not specifically limited, but in general the alcohol is used in a quantity a little less than or approximately equal to that of water.

Examples of aliphatic alcohols to be used in the present invention include monohydric alcohols having 1 to 8 carbon atoms such as methanol, ethanol, propanol, butanol, hexanol and octanol; polyhydric alcohols such as ethylene glycol, propylene glycol, diethylene glycol, triethylene glycol and tetraethylene glycol; and trimethylolpropane, neopentyl glycol, etc.

The present invention will be described, referring to xylene-formaldehyde resin as an example of the aromatic hydrocarbon-formaldehyde resin.

Ten to 35, or preferably 20 to 30, parts by weight of maleic anhydride and 5 to 50, or preferably 20 to 35, parts by weight of water are successively added to 100 parts by weight of xylene-formaldehyde resin, and then the resulting mixture are heated at 102° to 105° C. for 1 to 3 hours under reflux condition.

As the reaction proceeds, part of the acetal and formal bonds in the resin are broken to form formaldehyde, which readily dissolves in the water present in the reaction mixture. Thereafter, the temperature is raised to 190° to 220° C. over one hour or longer, while the formaldehyde formed during this step together with the previously formed aqueous solution of formaldehyde are distilled off to the outside of the reaction system, followed by heating at 190° to 220° C. for 4 to 8 hours to complete the reaction. The resulting modified resin shows an acid value of 10 to 40, and is dissolved in styrene in the presence of a polymerization inhibitor.

If more than 35 parts by weight of maleic anhydride are added, the quantity of acid exceeds the performance of the xylene-formaldehyde resin at which the acid is consumed, and the acid value of the resulting modified resin is not reduced down to a desired value. If the quantity is less than 10 parts by weight the cured product shows poor physical properties.

In the foregoing description, xylene-formaldehyde resin and maleic anhydride have been used as specific examples of reactants, but similar results can be obtained when other aromatic hydrocarbon-formaldehyde resins are used, for example, toluene-formaldehyde resin, mesityrene-formaldehyde resin, benzene-formaldehyde resin and styrene-formaldehyde resin, or other unsaturated dibasic acids than maleic anhydride are used. Similar results can be also obtained, when a saturated polybasic acid is further added, if necessary.

The foregoing reaction of an aromatic hydrocarbon-formaldehyde resin with an unsaturated polybasic acid, if desired, with a saturated polybasic acid, is usually carried out in the presence of an acid catalyst, and when an acid having a melting point lower than 100° C., e.g. maleic anhydride, or a water-soluble acid such as adipic acid is used, it is not necessary to use the catalyst since the acids themselves act as the acid catalyst.

The modified resin prepared according to the process of the present invention is dissolved in monomers such as styrene, vinyltoluene and diallyl phthalate, and the resulting solution can be easily cured in the presence of organic peroxides such as benzoyl peroxide, methylethylketone peroxide and ditertiary-butyl peroxide as catalyst in the same manner as in the case of the conventional unsaturated polyester resins.

The curing characteristics of the present resin are similar to those of the conventional unsaturated polyester resins, and the cured product has a high resistance to corrosion, and to water and alkalis in particular, and has excellent adhesiveness and electrical properties.

The modified resin prepared according to the process of the present invention can be used as corrosion-resistant FRP, gel coat, insulating varnish, primer and moulding resin.

Several examples will be given below to illustrate the invention further, where "parts" and "percents" are by weight unless otherwise specially mentioned.

EXAMPLE 1

A hundred parts of xylene-formaldehyde resin, 22 parts of maleic anhydride and 22 parts of water were introduced into a reactor provided with a stirrer, a thermometer, a reflux condenser and a formaldehyde distilling device.

The resulting mixture was subjected to reaction under reflux, with stirring, at 105° C. for 2 hours, and then the temperature was raised to 200° C. over one hour and a half to distill an aqueous solution of formaldehyde off the reaction mixture. Thereafter, the reaction was continued for 5 hours at 200° C. in a nitrogen gas stream to obtain 111 parts of a modified resin having an acid value of 25.

The modified resin thus obtained was dissolved in 73 parts of styrene containing 100 ppm of hydroquinone. The resulting solution will hereinafter be referred to as "resin (A)".

EXAMPLE 2

A hundred parts of mesitylene-formaldehyde resin, 30 parts of maleic anhydride and 30 parts of water were placed into the same reactor as used in Example 1, and after the resulting mixture was subjected to reaction under reflux, with stirring, at 105° C. for 2 hours, the temperature was raised to 200° C. over one hour and a half to distill an aqueous solution of formaldehyde off. Thereafter, the reaction was continued for 5 hours, and thus 118 parts of a modified resin having an acid value of 26 was obtained. The resulting resin was dissolved in 78 parts of styrene containing 100 ppm of hydroquinone.

The resulting solution will be hereinafter referred to as "resin (B)".

COMPARATIVE EXAMPLE

A hundred parts of the same xylene-formaldehyde resin as used in Example 1, and 22 parts of maleic anhydride were subjected to reaction at 200° C. for 5 hours in a nitrogen gas stream in the same reactor as used in Example 1, and 111 parts of a modified resin having an acid value of 30 were obtained.

During the reaction, sublimation of paraformaldehyde took place vigorously and the smell of formaldehyde was noticed.

The resulting resin was dissolved in 73 parts of styrene containing 100 ppm of hydroquinone. The resulting solution will be hereafter referred to as "resin (C)".

The "double bond content" was determined for each of the modified resins prepared in Examples 1 and 2 and the Comparative Example according to infrared absorption spectrum method, and their "double bond equivalent" was calculated from the "double bond content". The "theoretical double bond equivalent" was also calculated for each of the resins. Thereafter, the "percentage of retained double bond" was calculated as a ratio of the theoretical equivalent to the observed one. The results are shown in the following table.

TABLE 1

| | Percentage of retained double bond of modified resins | | |
|---|---|---|---|
| | Ex. 1 | Ex. 2 | Comp. Ex. |
| Observed double bond equivalent | 509 | 394 | 789 |
| Theoretical double bond equivalent | 489 | 382 | 489 |
| Percentage of retained double bond (%) | 96 | 97 | 62 |

"Double bond equivalent" means a molecular weight per double bond, and may be expressed by the following equation;

$$\text{Theoretical double bond equivalent} = \frac{\left(\text{Weight of raw material resin}\right) \times \frac{\left(\text{Weight of modified resin}\right)}{\left(\text{Weight of raw material resin}\right)}}{\left(\text{Moles of maleic anhydride added}\right)}$$

It is apparent from the foregoing Table that the modified resins prepared according to the present invention have a far higher percentage of retained double bonds in the product resins, as compared with the modified resin of Comparative Example.

These percentages of retained double bond are similar to those of the conventional unsaturated polyester prepared from, e.g. phthalic anhydride-maleic anhydride-propylene glycol. This means that the modified resin of the present invention is comparable enough, in reactivity, to the conventional unsaturated polyester resins.

The following Table shows some high-temperature curing characteristics of resins (A), (B) and (C) which were prepared in Examples 1 and 2 and Comparative Example, respectively.

TABLE 2

| | High-temperature curing characteristics of resins | | |
|---|---|---|---|
| | Resin | | |
| | (A) | (B) | (C) |
| Gel time (min.) | 4.3 | 4.2 | 5.2 |
| Cure time (min.) | 7.4 | 7.3 | 10.6 |
| Peak exotherm temperature (°C.) | 195 | 205 | 130 |
| Reactivity (°C./sec) | 1.05 | 1.1 | 0.4 |

The above characteristics were determined according to JIS K-6901. Amount of BPO (benzoyl peroxide) added: 1%. Temperature: 80° C.

Gel time: Time (in minutes) required for reaching 85° C. starting from 65° C.

Cure time: Time (in minutes) required for from 65° C. to peak exotherm temperature.

$$\text{Reactivity (°C./sec)} = \frac{\text{(Peak exotherm temperature)}}{\text{(Cure time)} - \text{(Gel time)}}$$

Resins (A) and (B) prepared according to the present invention had better curing characteristics as compared with resin (C) prepared without removing the formaldehyde from the reaction mixture.

The following Table shows some physical and chemical properties of cast products of resins (A), (B) and (C); it is evident therefrom that the modified resins of the present invention have a higher resistance to water and alkalis as well as higher mechanical strength.

TABLE 3

| | Physical and chemical properties of cast plates | | |
|---|---|---|---|
| | Resin | | |
| | (A) | (B) | (C) |
| Shrinkage (%) | 7.0 | 7.7 | 5.0 |
| Barcol hardness | 41 | 42 | 36 |
| HDT (°C.) | 78 | 85 | 40 |
| Flexural strength (kg/mm$^2$) | 11 | 11 | 9.8 |
| Tensile strength (kg/mm$^2$) | 11 | 10.5 | 10.0 |
| Elongation (%) | 2.2 | 2.1 | 2.3 |
| Boiling water absorption percentage, 100° C., 2 hrs | 0.3 | 0.3 | 0.4 |
| Resistance to boiling water 100° C., 1000 hrs | o | o | x |
| Resistance to alkalis, 10% NaOH aq. soln., 100° C., 100 hrs | o | o | x | o: no crack was formed
x: cracks were formed

The cast plates used for measurement of the above characteristics had a thickness of 3 mm and were obtained by adding 1%, based on resin, of benzoyl peroxide to each of resins (A), (B) and (C), and carrying out curing at 60° C. for 16 hours, 80° C. for 2 hours, 100° C. for 2 hours and 120° C. for 2 hours. Characteristics were determined according to JIS K-6911 and K-6919.

EXAMPLE 3

In the same reactor as used in Example 1, 100 parts of xylene-formaldehyde resin, 25 parts of maleic anhydride, 22 parts of water, and 5 parts of propylene glycol were subjected to reaction at 105° C. under reflux, with stirring, for 2 hours and then the temperature was raised to 200° C. over one hour and a half to distill dioxolane and an aqueous solution of formaldehyde off. The distillate amounted to 36 parts. The remaining mixture was then heated for 5 hours at 200° C., with stirring, in a nitrogen gas stream and thus 118 parts of a modified resin having an acid value of 27 were obtained.

The resulting modified resin was dissolved in 73 parts of styrene containing 100 ppm of hydroquinone. The resulting liquid will be hereinafter referred to as "resin (D)".

EXAMPLE 4

In the same reactor as used in Example 1, 100 parts of xylene-formaldehyde resin, 18 parts of maleic anhydride, 10 parts of adipic acid, and 28 parts of water were subjected to reaction at 105° C. under reflux, with stirring, for 2 hours, and then the temperature was raised to 200° C. over one hour and a half, while distilling an aqueous solution of formaldehyde off. Thereafter, the residue was heated for 5 hours at 200° C., with stirring, in a nitrogen gas stream, and 116 parts of a modified resin having an acid value of 25 were obtained.

The modified resin thus obtained was dissolved in 78 parts of styrene containing 100 ppm of hydroquinone. The resulting liquid will be hereinafter referred to as "resin (E)".

The double bond content was determined for each of resins (D) and (E) in the same manner as described before. The percentage of retained double bonds of resins (D) and (E) were 96.0% and 95.7%, respectively.

The following Table 4 shows the high-temperature curing characteristics of these resins. The succeeding Table 5 shows the properties of cast plates produced from resins (D) and (E) in the same manner as in Examples 1 and 2.

TABLE 4

| High-temperature curing characteristics of resins (D) and (E) | | |
|---|---|---|
| | Resin | |
| | (D) | (E) |
| Gel time (min.) | 4.3 | 4.6 |
| Cure time (min.) | 7.5 | 8.5 |
| Peak exotherm temperature (°C.) | 200 | 180 |
| Reactivity (°C./sec) | 1.04 | 0.77 |

TABLE 5

| Physical and chemical properties of cast plates of resins (D) and (E) | | |
|---|---|---|
| | Resin | |
| | (D) | (E) |
| Shrinkage (%) | 7.2 | 6.8 |
| Barcol hardness | 41 | 38 |
| HDT (°C.) | 80 | 65 |
| Flexural strength (kg/mm$^2$) | 10.5 | 10.0 |
| Tensile strength (kg/mm$^2$) | 10.5 | 10.0 |
| Elongation (%) | 2.1 | 4.0 |
| Boiling water absorption percentage, 100° C., 2 hrs | 0.3 | 0.35 |
| Resistance to boiling water 100° C., 1000 hrs | o | o |
| Resistance to alkalis, 10% NaOH aq. sol., 100° C., 100 hrs | o | o |

EXAMPLE 5

In the same reactor as used in Example 1, 100 parts of xylene-formaldehyde resin, 26 parts of fumaric acid, and 22 parts of water were subjected to reaction at 105° C. under reflux, with stirring, for 2 hours, and then while the temperature was gradually raised to 200° C., an aqueous solution of formaldehyde was distilled off over one hour and a half. The residue was then heated at 200° C., with stirring, for 8 hours in a nitrogen gas stream and 115 parts of a modified resin having an acid value of 28 was obtained. The modified resin thus obtained was dissolved in 74 parts of styrene containing 100 ppm of hydroquinone. The resulting liquid will be hereinafter referred to as "resin (F)".

EXAMPLE 6

In the same reactor as used in Example 1, 100 parts of xylene-formaldehyde resin, 20 parts of maleic anhydride, 5 parts of isophthalic acid, and 22 parts of water were subjected to reaction at 105° C. under reflux, with stirring, for 2 hours, and then while the temperature was gradually raised to 200° C., an aqueous solution of formaldehyde formed was distilled off over one hour and a half. The residue was then heated at 200° C., with stirring, for 5 hours in a nitrogen gas stream and 114 parts of a modified resin having an acid value of 26 were obtained. The modified resin thus obtained was dissolved in 76 parts of styrene containing 100 ppm hydroquinone. The resulting liquid will be hereinafter referred to as "resin (G)".

EXAMPLE 7

In the same reactor as used in Example 1, 100 parts of xylene-formaldehyde resin, 25 parts of maleic anhydride, 22 parts of water, and 5 parts of butanol were subjected to reaction at 108° C. under reflux, with stirring, for 2 hours, and then while the temperature was raised to 215° C. over one hour and a half, an aqueous butyl-formal and an aqueous solution of formaldehyde were distilled off. The residue was then heated at 200° C., with stirring, for 5 hours in a nitrogen gas stream, and 114 parts of a modified resin having an acid value of 27 were obtained. The modified resin thus obtained was dissolved in 73 parts of styrene containing 100 ppm of hydroquinone. The resulting liquid will be hereinafter referred to as "resin (H)".

EXAMPLE 8

In a reactor provided with a stirrer, a thermometer, a reflux condenser, a steam-introducing pipe and a formaldehyde-distilling device, 100 parts of xylene-formaldehyde resin, 22 parts of maleic anhydride, and 8 parts of water were subjected to reaction at 105° C. under reflux, with stirring, for 30 minutes, and then while steam was introduced into the reactor at a rate of 10 parts per hour, the temperature was raised to 200° C. over one hour and a half to distill an aqueous solution of formaldehyde off. The residue was then heated at 200° C., with stirring, for 5 hours in a nitrogen gas stream, and 111 parts of a modified resin having an acid value of 24 were obtained. The resulting modified resin was dissolved in 73 parts of styrene containing 100 ppm of hydroquinone. The resulting liquid will be hereinafter referred to as "resin (I)".

EXAMPLE 9

In the same reactor as used in Example 8, 100 parts of xylene-formaldehyde resin and 22 parts of maleic anhydride were subjected to reaction, with stirring, raising the temperature to 200° C., over a period of 2 hours, while introducing steam into the reactor at a rate of 15 parts per hour. An aqueous solution of formaldehyde was distilled off the reactor.

The residue was then heated at 200° C., with stirring, for 5 hours in a nitrogen gas stream, and 112 parts of a modified resin having an acid value of 26 was obtained.

The resulting modified resin was dissolved in 73 parts of styrene containing 100 ppm of hydroquinone. The resulting liquid will be hereinafter referred to as "resin (J)".

The double bond content was determined in the same manner as described before for each of the modified resins obtained in Examples 5-9. These modified resins had percentage of retained double bond of 96, 96.5, 96.5, 97, and 97%, respectively.

The following Table 6 shows high-temperature curing characteristics of resins (F), (G), (H), (I) and (J), and Table 7 shows physical and chemical properties of cast plates prepared from these resins in the same manner as in Examples 1 and 2.

TABLE 6

| | Resin | | | | |
|---|---|---|---|---|---|
| | (F) | (G) | (H) | (I) | (J) |
| Gel time (min.) | 4.0 | 4.5 | 4.3 | 4.2 | 4.3 |
| Cure time (min.) | 6.8 | 7.8 | 7.5 | 7.2 | 7.4 |
| Peak exotherm temperature (°C.) | 210 | 190 | 198 | 205 | 200 |
| Reactivity (°C./sec) | 1.25 | 0.96 | 1.03 | 1.14 | 1.08 |

TABLE 7

| | Resin | | | | |
|---|---|---|---|---|---|
| | (F) | (G) | (H) | (I) | (J) |
| Shrinkage (%) | 7.2 | 6.9 | 7.1 | 7.0 | 7.0 |
| Barcol hardness | 42 | 40 | 41 | 41 | 41 |
| Heat distortion temperature (°C.) | 83 | 78 | 80 | 78 | 77 |
| Flexural strength (kg/mm$^2$) | 12 | 10.5 | 11.5 | 11 | 11 |
| Tensile strength (kg/mm$^2$) | 11 | 10 | 10.5 | 11 | 11 |
| Elongation (%) | 2.1 | 2.0 | 2.1 | 2.2 | 2.2 |
| Boiling water absorption percentage, 100° C., 2 hrs | 0.3 | 0.3 | 0.3 | 0.3 | 0.3 |
| Resistance to boiling water 100° C., 1000 hrs | o | o | o | o | o |
| Resistance to alkalis, 10% NaOH aq. sol., 100° C., 100 hrs | o | o | o | o | o |

What is claimed is:

1. In a process for the preparation of a modified aromatic hydrocarbon resin by reacting an aromatic hydrocarbon-formaldehyde resin with an unsaturated polybasic acid or an anhydride thereof, optionally together with a saturated polybasic acid or an anhydride thereof, the improvement which comprises reacting 10 to 35 parts by weight of an unsaturated polybasic acid or an anhydride thereof with 100 parts by weight of an aromatic hydrocarbon-formaldehyde resin in the presence of 5 to 50 parts by weight of water or water and aliphatic alcohol per 100 parts by weight of the aromatic hydrocarbon-formaldehyde resin, while removing formaldehyde solution formed by the reaction to the outside of the reaction system during the reaction by raising the temperature to 190° to 220° C. for at least one hour.

2. The process according to claim 1, wherein the aliphatic alcohol is at least one lower alcohol having 1 to 8 carbon atoms selected from methanol, ethanol, propanol, butanol, hexanol and octanol.

3. The process according to claim 1 wherein the aliphatic alcohol is at least one polyhydric alcohol selected from ethylene glycol, propylene glycol, diethylene glycol, triethylene glycol, tetraethylene glycol, trimethylolpropane and neopentyl glycol.

4. The process according to claim 1 wherein the aromatic hydrocarbon-formaldehyde resin is selected from xylene-formaldehyde resin and mesitylene-formaldehyde resin.

5. A process for the preparation of a modified aromatic hydrocarbon resin which comprises adding 10 to 35 parts by weight of an unsaturated polybasic acid or an anhydride thereof and 5 to 50 parts by weight of water or water and an aliphatic alcohol to 100 parts by weight of aromatic hydrocarbon-formaldehyde resin, subjecting the resulting mixture to reaction at 102° C. to 105° C. under reflux for 1 to 3 hours, removing the formaldehyde formed by the reaction in the form of an aqueous solution while the temperature is raised to 190° to 220° C. over a period of at least one hour, and then completing the reaction of the aromatic hydrocarbon-formaldehyde resin with the unsaturated polybasic acid or anhydride thereof, optionally together with a saturated polybasic acid or an anhydride thereof, at the same time.

6. The process according to claim 1 or 5 wherein the modified aromatic hydrocarbon resin has an acid value of 10 to 40.

7. The process according to claim 1 or 5 wherein the water is introduced in the form of steam.

8. The process according to claim 1 or 5, wherein the aliphatic alcohol is a monohydric alcohol having 1 to 8 carbon atoms or a polyhydric alcohol.

* * * * *